Oct. 30, 1962     D. S. SCHWARTZ     3,060,748
ACCELEROMETER
Filed Oct. 29, 1959     2 Sheets-Sheet 1
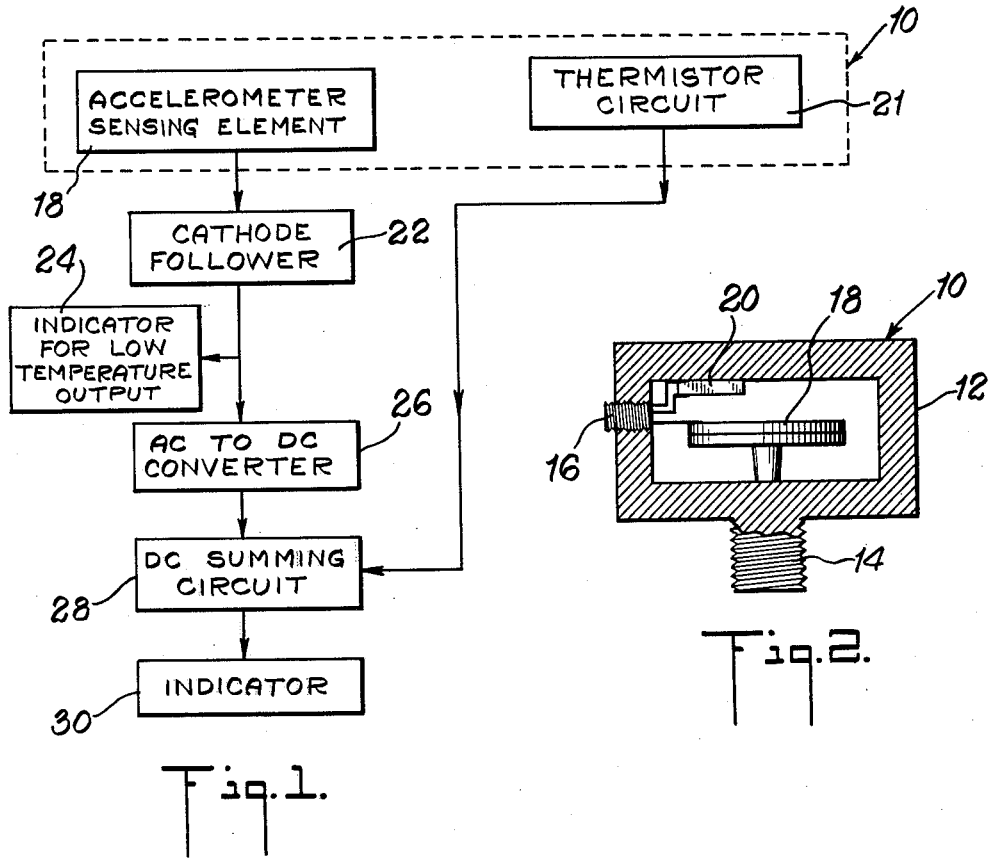
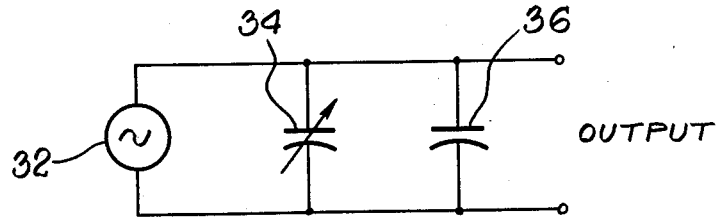
INVENTOR.
DANIEL S. SCHWARTZ
BY
Cyrus D. Samuelson
ATTORNEY Oct. 30, 1962  D. S. SCHWARTZ  3,060,748
ACCELEROMETER
Filed Oct. 29, 1959  2 Sheets-Sheet 2

INVENTOR.
DANIEL S. SCHWARTZ
BY
Cyrus D. Samuelson
ATTORNEY

United States Patent Office 3,060,748
Patented Oct. 30, 1962

3,060,748
ACCELEROMETER
Daniel S. Schwartz, Nixon, N.J., assignor to Gulton Industries, Inc., Metuchen, N.J., a corporation of New Jersey
Filed Oct. 29, 1959, Ser. No. 849,611
10 Claims. (Cl. 73—497)

My invention relates to accelerometers and in particular to those accelerometers which use active elements whose outputs normally decrease at elevated temperatures. More specifically, an important object of my invention is to provide an accelerometer with a substantially flat output characteristic when using electromechanically sensitive elements which exhibit decreased output at elevated temperatures. As a general rule, the reduction in output is due to the properties of the sensing element but it may also be due to the design characteristics of the accelerometer itself.

A further object of my invention is to provide an accelerometer having a piezoelectric ceramic sensing element and an automatic temperature correction network with at least one thermistor.

A still further object of my invention is to provide an accelerometer wherein its temperature is measured and a correction is applied to the measurement by the user.

Figure 4A:
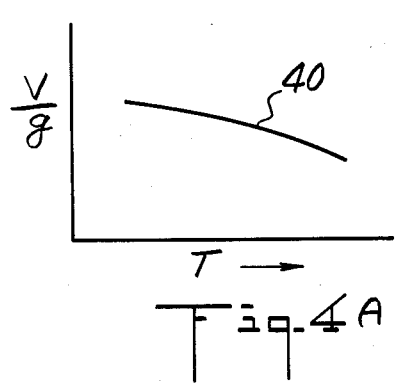
Figure 4B:
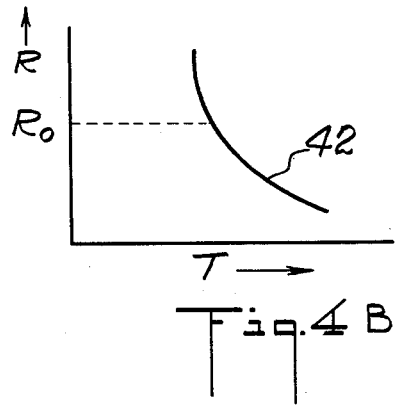

These and other objects, advantages, features and uses will be apparent during the course of the following description when taken in conjunction with the accompanying drawings wherein:

FIGURE 1 is a block diagram of a preferred embodiment of temperature corrected accelerometer of my invention, FIGURE 2 is an elevational view, partly in cross-section, of the accelerometer used in the system illustrated in FIGURE 1, FIGURE 3 is a simplified equivalent circuit of an accelerometer, operating below resonance, having a piezoelectric ceramic sensing element, FIGURE 4A is a plot of output voltage divided by the acceleration of gravity against temperature for a given sensing element, FIGURE 4B is a plot of resistance against temperature for a typical thermistor, and FIGURES 5, 6 and 7 serve to illustrate the theory underlying my invention.

In the drawings, wherein, for the purpose of illustration, is shown a preferred embodiment of my invention, the numeral 10 generally designates an accelerometer of my invention. In FIGURE 2, accelerometer 10 is seen to comprise case 12, mounting stud 14, output connector 16, sensing element 18 and thermistor 20. The accelerometer of FIGURE 2 may be used for either automatic or manual temperature correction. In FIGURE 1, there is shown a block diagram of an automatic, temperature-corrected accelerometer of my invention. Thermistor circuit 21 comprises a thermistor in series with a battery and a variable resistor with the output taken off across the variable resistor (circuit details not shown). Cathode follower 22 is connected to the output of sensing element 18 and is of the type well known in the art such as has been described on page 102 of Seely, "Electron Tube Circuits," published by McGraw-Hill Book Company (1st edition). The output of cathode follower 22 is fed at low temperatures to indicator 24 and when the accelerometer is used for high temperature measurements, the output of cathode follower 22 is fed to A.C. to D.C. converter 26. Converter 26 is of the usual A.C. to D.C. type commonly used in the art.

The output of converter 26 is fed to one input of D.C. summing circuit 28, to the other input of which is connected the output from thermistor circuit 21. Thermistor circuit 21 may also be considered to be a part of D.C. summing circuit 28. D.C. summing circuit 28 uses thermistors and is of the type described below and illustrated in FIGURES 5 and 7. The output of circuit 28 is fed to indicator 30. Indicators 24 and 30 may be recorders, oscilloscopes, meters or any other output indicating devices.

In FIGURE 3, there is shown a simplified equivalent circuit of an accelerometer, operating below resonance, having a piezoelectric sensing element and wherein 32 designates the equivalent generator of the sensing element, 34 designates the capacitor whose capacity is equivalent to that of the sensing element and which is a function of temperature and 36 designates the capacitor whose capacity is equivalent to that of the cable connected to the accelerometer. In FIGURE 4A, curve 40 is a plot of voltage divided by the acceleration of gravity against temperature for a given acceleration applied to a piezoelectric ceramic sensing element.

Sensing element 18 is preferably formed of piezoelectric ceramic material such as the titanates, niobates and similar compositions and more particularly may be formed largely of barium titanate or lead titanate-zirconate. However, any other electromechanically sensitive material may also be employed. While I have shown the accelerometer in the form of a "mushroom type" which is well known in the art, other forms of mass-loaded sensing elements may be used in accelerometers of my invention.

Considering an accelerometer whose output for a given acceleration decreases as the temperature rises, the output of such an accelerometer may be as shown in curve 40. This reduction in output may be due to the properties of the ceramic from which the sensing element is formed or to design factors in the accelerometer. The relative dielectric constant of the material is a maximum at the Curie temperature and drops off, essentially symmetrically, on each side of the Curie temperature. The piezoelectric modulus rises to a peak at some point below the Curie temperature and falls off quite rapidly after the Curie temperature is reached. The piezoelectric modulus is generally referred to as $d_{ij}$ and is equal to the strain divided by the field. Another piezoelectric modulus is $g_{ij}$ which is equal to the voltage divided by the stress and is approximately equal to $$\frac{d_{ij}}{ke_o}$$

where $k$ is the relative dielectric constant and $e_o$ is the dielectric constant of free space $$=8.854\times 10^{-14}\frac{\text{farads}}{\text{cm.}}=\frac{1}{4\pi(.9\times 10^{12})}$$

Below the resonant frequency of an accelerometer, the piezoelectric ceramic acts as a capacitor shunted by a generator (FIGURE 3). This is further shunted by the cable capacitance which for all practical purposes is constant over the temperature range. The output of the generator is a function of temperature and acceleration and the capacitance of the sensing element is a function of the temperature.

Now $Q=CV$ and here C equals the sum of the capacitances of capacitors 34 and 36.

$$d_{ij}=\frac{Q/A}{F/A}=\frac{Q}{F} \text{ or } Q=Fd_{ij}$$

where

F is the mass load times the acceleration applied to the sensing element and
A is the equivalent area of the element.

Then, $Fd_{ij}=(C_{el}+C_{cab})V$ where $C_{el}$ is the capacitance of the sensing element and $C_{cab}$ is the capacitance of the cable.

Now, let $$F = ma = mng(a-ng)$$

from which, we get $$\frac{V}{g} = \frac{mnd_{ij}}{C_{el} + C_{cnb}}$$

From this, it can be seen that $d_{ij}$ and $C_{el}$ must be specific functions of temperature so that the ratio of V to g shall remain constant with temperature. This is possible over certain temperature ranges but is certainly not true in the vicinity of the Curie temperature where $d_{ij}$ is decreasing and the dielectric constant is increasing.

Consider an accelerometer whose output at a particular value of g is of the form shown by curve 40. The output desired is a line parallel to the x-axis. One method of accomplishing this result is to mount a thermistor in the accelerometer such that it is subjected to the same temperature as the sensing element and to supply the user with a correction similar to that of curve 44 of FIGURE 6 to enable him to apply the correction to the observed acceleration.

Since it is not always desirable or practical to apply temperature correction to the observed acceleration as measured by the accelerometer, it becomes necessary to provide an accelerometer which automatically makes the necessary temperature compensation. This is accomplished by providing a thermistor circuit which is included in or mounted on the accelerometer case and whose output curve is that shown as curve 44 of FIGURE 6. This may be accomplished by placing a temperature sensing thermistor 20 within the case of accelerometer 10 and placing the balance of the thermistor circuit 21 with the electronic equipment associated with the accelerometer. The simplest circuit to use is a series circuit of the thermistor, a source of voltage and a resistor, with the output taken off across the resistor as shown, for example, in FIGURE 5. However, any other thermistor circuit may be used to accomplish the result of providing a temperature correction output which is the conjugate of the output from the acceleration sensing element.

Following is a description of the theory underlying the invention:

(1) The output of sensing element 18 has the output-temperature characteristic shown on curve 40 of FIGURE 4A.

(2) A thermistor has resistance-temperature dependence of the form $R = R_o e^{-\beta T}$ as shown by curve 42 of FIGURE 4B.

Figure 5:
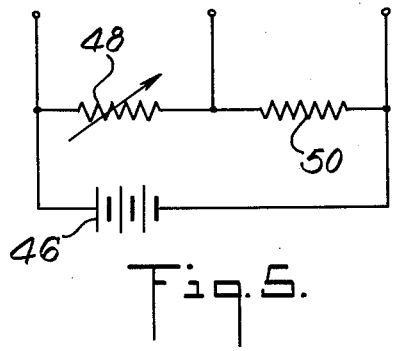

(3) Consider the circuit of FIGURE 5, wherein 48 designates a thermistor having a resistance $R_T$, 50 designates a resistor having a resistance R and 46 designates a battery. Call the voltage across thermistor 48 $V_T$, that across resistor 50 $V_R$, and that supplied by battery 46 V.

Since $$V = IR, I = \frac{V_R}{R} = \frac{V_T}{R_T}$$

or $$V_R = \frac{RV_T}{R_T}$$

Now, $V = V_R + V_T$; $V_T = V - V_R$

Thus $$V_R = \frac{R(V-V_R)}{R_T} = \frac{RV}{R_T} - \frac{RV_R}{R_T}$$

or $$V_R\left(1 + \frac{R}{R_T}\right) = \frac{RV}{R_T}$$

and $$V_R = \frac{RV}{R_T(1+R/R_T)} = \frac{RV}{R_T+R}$$

Figure 6:
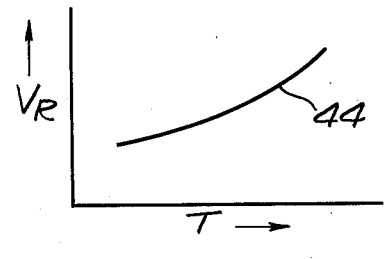

Since the thermistor follows the relation $R_T = R_o e^{-\beta T}$, the temperature dependence for the voltage across resistor 50 is of the form of curve 44 of FIGURE 6. The effect of temperature on the resistance of the resistor may be neglected since its resistance change with temperature is much smaller than that of the thermistor.

(4) Cathode follower 22 may be of the vacuum tube type or may be an emitter follower if transistors are used. Both these devices have high impedance input and low impedance output and are used to match high impedance output to low impedance input devices so that undesired loading effects are minimized.

(5) For low temperature operation, the output of cathode follower 22 is fed to indicator 24 which may contain a meter, oscilloscope or other device which produces the voltage display desired. For operation of the same device at both high and low temperatures it is deemed advisable to incorporate a circuit such as is shown in FIGURE 7 ahead of the meter which is a part of indicator 24. Resistor 54 (resistance=$R_C$) is a compensating resistor across thermistor 56 (resistance=$R_T$) and the parallel circuit is in series with resistor 52 (resistance=R).

A relay (not shown) is connected across resistor 52 and set so that at low temperatures, the relay is not actuated and the output of the cathode follower is fed directly to the meter. This is accomplished by making $R_C$ very small with respect to $R_T$ at room temperatures. As the temperature rises, $R_T$ decreases and $R_C$ is selected so that at a predetermined temperature, the resistance of the parallel combination is controlled by the value of $R_T$. At the predetermined temperature, the relay operates because there is sufficient voltage across resistor 52 to do so and the output of cathode follower 22 is applied to A.C. to D.C. converter 26.

The predetermined temperature is determined by the sensing element characteristics and is usually the temperature at which curve 40 starts to fall off rapidly. If desired, the switching may be made manually and the user may have his choice of either output at any instant. This manual switching may be accomplished by a single-pole double-throw switch which may be directly, or remotely controlled. In addition, the thermistor circuit may be fused so that a burned out fuse indicates that the accelerometer has been subjected to excessive temperature and should either be recalibrated or have the element replaced.

(6) A.C. to D.C. converter 26 may be any type of A.C. to D.C. converter and under certain conditions may be a group of R-C filter networks.

Figure 7:
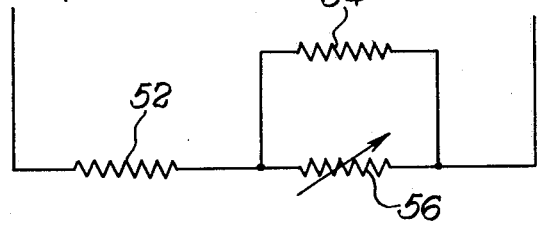

(7) D.C. summing circuit 28 is similar to the circuit of FIGURE 7 with the inputs applied across resistor 52 and thermistor 56 and the output taken off across the total circuit.

(8) Indicator 30 may be a meter, oscilloscope or other device used to display voltage.

In operation, the output of accelerometer sensing element 18 is fed to cathode follower 22 whose function is to couple the sensing element to A.C. to D.C. converter 26. This output is then fed into D.C. summing circuit 28 consisting of resistors and thermistors such that the circuit is compensating and the D.C. voltage out is a constant independent of temperature. The indicator may be a meter, oscilloscope or any other type depending on the kind of display desired.

The output of the D.C. summing circuit 28 may be reconverted to A.C. by a chopping circuit if it is more desirable to transmit the intelligence by A.C. than by D.C. However, it is not deemed advisable to operate without the A.C. to D.C. converter 26. This is due to the fact that there might be different wave forms in the outputs of the sensing element 18 and thermistor 20 which would result in a complex wave summation instead of in an in phase addition as plotted by a straight line parallel to the X-axis. Another advantage of having the thermistor 20 in the accelerometer's temperature environment is to serve as an indication of the temperature of the sensing element 18 so that the user will be made aware of any cycling of the accelerometer above its calibrated range and even into the non-reversible or Curie temperature ranges.

While I have disclosed my invention in relation to a specific example and in a specific embodiment, I do not wish to be limited thereto, for obvious modifications, including using the teachings of my invention in connection with accelerometers having sensing elements which are piezoresistive, magnetostrictive, natural or artificial piezoelectrics, will occur to those skilled in the art without departing from the spirit and scope of my invention.

Having thus described my invention, I claim:

1. An accelerometer comprising a mass-loaded electromechanically sensitive element which produces electrical signals in accordance with mechanical accelerations and wherein said signals are affected by temperature conditions at said element, a thermistor circuit responsive to the temperature at said electromechanically sensitive element for producing electrical signals in accordance with the values of said temperature, said thermistor circuit comprising a thermistor, a source of D.C. voltage and a resistor, amplifying means connected to the output of said electromechanically sensitive element, an A.C. to D.C. converter connected to the output of said amplifying means, a D.C. summing circuit having two inputs for summing the electrical signals of said electromechanically sensitive element and said thermistor circuit for compensating for the temperature conditions at said electromechanically sensitive element to produce at the output thereof a summed signal corresponding to the mechanical accelerations of said electromechanically sensitive element, the output of said A.C. to D.C. converter being connected to one of said inputs, the output of said thermistor circuit being connected to the other of said inputs, and an indicator responsive to said summed signal connected to the output of said D.C. summing circuit.

2. An accelerometer as described in claim 1 wherein said amplifying means is a cathode follower.

3. An accelerometer as described in claim 2 wherein said cathode follower has two outputs and including an indicator connected to the second output of said cathode follower.

4. An accelerometer as described in claim 1 wherein said electromechanically sensitive element is a ferroelectric ceramic.

5. An accelerometer including an electromechanically sensitive element which produces electrical signals in accordance with mechanical accelerations and wherein said signals are affected by temperature conditions at said element, a thermistor circuit including a thermistor responsive to the temperature at said element for producing electrical signals in accordance with the values of said temperature, means for summing the electrical signals of the electromechanically sensitive element and the thermistor circuit for compensating for the temperature conditions at said element to produce an ultimate electrical signal corresponding to the mechanical accelerations of said element, and an indicator controlled by said ultimate electrical signal.

6. An accelerometer including an electromechanically sensitive element which produces electrical signals in accordance with mechanical accelerations and wherein said signals are affected by temperature conditions at said element, a thermistor circuit including a thermistor responsive to the temperature at said element for producing D.C. electrical signals in accordance with the values of said temperature, means for converting the electrical signals from said electromechanically sensitive element to corresponding D.C. electrical signals, means for summing said D.C. electrical signals from said last mentioned means and said thermistor circuit for compensating for the temperature conditions at said element to produce an ultimate D.C. electrical signal corresponding to the mechanical accelerations of said element, and an indicator controlled by said ultimate D.C. electrical signal.

7. An accelerometer including an electromechanically sensitive element which produces electrical signals in accordance with mechanical accelerations and wherein said signals are affected by high temperature conditions at said element, a first indicator controlled by said electrical signals for indicating accelerations of said element at low temperature conditions, a thermistor circuit including a thermistor responsive to high temperatures at said element for producing electrical signals in accordance with the values of said temperature, means for summing the electrical signals of the electromechanically sensitive element and the thermistor circuit for compensating for the temperature conditions at said element to produce an ultimate electrical signal corresponding to the mechanical accelerations of said element, and a second indicator controlled by said ultimate electrical signal.

8. An accelerometer comprising an electromechanically sensitive element which produces electrical signals in accordance with mechanical accelerations and wherein said electrical signals are affected by temperature conditions at said electromechanically sensitive element, a thermistor circuit responsive to the temperature at said electromechanically sensitive element for producing electrical signals in accordance with the values of said temperature, said thermistor circuit comprising a thermistor, a source of D.C. voltage and a resistor, a D.C. summing circuit having two inputs for summing the electrical signals of said electromechanically sensitive element and said thermistor circuit for compensating for the temperature conditions at said electromechanically sensitive element to produce at the output thereof a summed signal corresponding to the mechanical accelerations of said electromechanically sensitive element, the electrical signal from said electromechanically sensitive element being applied to one of said inputs, the electrical signal from the output of said thermistor circuit being applied to the other of said inputs, and an indicator responsive to said summed signal connected to the output of said D.C. summing circuit.

9. An accelerometer comprising an electromechanically sensitive element which produces electrical signals in accordance with mechanical accelerations and wherein said electrical signals are affected by temperature conditions at said electromechanically sensitive element, a thermistor circuit responsive to the temperature at said electromechanically sensitive element for producing D.C. electrical signals in accordance with the values of said temperature, said thermistor circuit comprising a thermistor, a source of D.C. voltage and a resistor, means for converting the electrical signals from said electromechanically sensitive element to corresponding D.C. electrical signals, a D.C. summing circuit having two inputs for summing the electrical signals of said means for converting the electrical signals from said electromechanically sensitive element and said thermistor circuit for compensating for the temperature conditions at said electromechanically sensitive element to produce at the output thereof a D.C. summed signal corresponding to the mechanical accelerations of said electromechanically sensitive element, the output of said means for converting the electrical signals from said electromechanically sensitive element being connected to one of said inputs, the output of said thermistor circuit being connected to the other of said inputs, and an indicator responsive to said D.C. summed signal connected to the output of said D.C. summing circuit.

10. An accelerometer comprising an electromechanically sensitive element which produces electrical signals in accordance with mechanical accelerations and wherein said electrical signals are affected by high temperature conditions at said electromechanically sensitive element, a first indicator controlled by said electrical signals for indicating mechanical accelerations of said electromechanically sensitive element at low temperature conditions, a thermistor circuit responsive to high temperatures at said electromechanically sensitive element for producing electrical signals in accordance with the values of said temperature, said thermistor circuit comprising a thermistor, a source of D.C. voltage and a resistor, a D.C. summing circuit having two inputs for summing the electrical signals of said electromechanically sensitive element and said thermistor circuit for compensating for the high temperature conditions at said electromechanically sensitive element to produce at the output thereof a summed signal corresponding to the mechanical accelerations of said electromechanically sensitive element, the electrical signals from said electromechanically sensitive element being applied to one of said inputs, the electrical signals from the output of said thermistor circuit being applied to the other of said inputs, and a second indicator responsive to said summed signal connected to the output of said D.C. summing circuit.

References Cited in the file of this patent

UNITED STATES PATENTS

| | | |
|---|---|---|
| 1,379,266 | Keeler | May 24, 1921 |
| 1,745,149 | Carney | Jan. 28, 1930 |
| 2,286,436 | Odell | June 16, 1942 |
| 2,420,692 | Wainer | May 20, 1947 |
| 2,470,738 | Bach | May 17, 1949 |
| 2,471,143 | Cress | May 24, 1949 |
| 2,515,083 | Franklin | July 11, 1950 |
| 2,618,776 | Wiancko | Nov. 18, 1952 |
| 2,684,592 | Hadady | July 27, 1954 |
| 2,945,379 | Barnes et al. | July 19, 1960 |
| 2,947,887 | Gulton | Aug. 2, 1960 |